Jan. 23, 1962     J. GEIGER ET AL     3,018,177
PHOTOGRAPHIC FILM WITH ANTIHALATION LAYER
Filed March 17, 1958
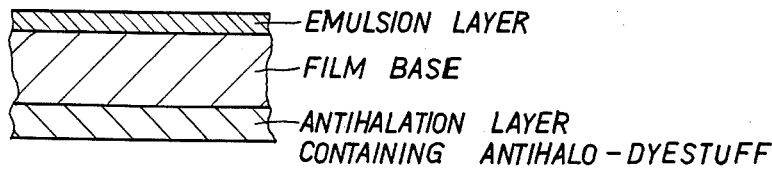
EMULSION LAYER
FILM BASE
ANTIHALATION LAYER
CONTAINING ANTIHALO-DYESTUFF
INVENTORS:
JULIUS GEIGER, ARMIN OSSENBRUNNER, MAX COENEN.
BY
Connolly and Hutz
their ATTORNEYS United States Patent Office 3,018,177
Patented Jan. 23, 1962

3,018,177
PHOTOGRAPHIC FILM WITH ANTIHALATION LAYER
Julius Geiger and Armin Ossenbrunner, Leverkusen, and Max Coenen, Uerdingen, Germany, assignors to Agfa Aktiengesellschaft, Leverkusen, Germany, a corporation of Germany
Filed Mar. 17, 1958, Ser. No. 722,086
Claims priority, application Germany Mar. 29, 1957
2 Claims. (Cl. 96—84)

The invention relates to photographic materials and more especially to photographic films having an antihalation layer. In order to dye the layer support of photographic materials for anti-halation (grey-base) purposes, it is known to use a mixture of a yellow dyestuff which has its absorption maximum in the blue range of the spectrum with a red dyestuff which has its absorption maximum in the green range of the spectrum and with a cyan or blue dyestuff which has its absorption maximum in the red range of the spectrum. The dyestuffs are added to the film-casting solution prior to casting or are applied to the film after casting by means of suitable solvents by a dipping or coating process. Low molecular weight aliphatic alcohols, such as for example methanol, chlorinated aliphatic hydrocarbons, such as for example methylene chloride, and alkylene halides, such as for example ethylene chloride, are suitable as solvents for the dyestuffs.

Moreover, it is also known for dyed lacquer layers to be provided on the back of undyed layer supports of photographic materials for anti-halation purposes, the said lacquer layers being detached and bleached in the photographic baths. Whereas the dyestuffs or dyestuff mixtures formerly used for anti-halation purposes generally guarantee a more or less uniform absorption in the visible range of the spectrum, i.e. from 400 to 700 m$\mu$, they offer only a slight protection or no protection at all in the infra-red or near infra-red, i.e. from 700 to 800 m$\mu$.

It has been found that triphenyl methane dyestuffs which are obtained by reacting p,p'-dihalogen- or p,p'-dialkoxy triphenyl carbinols with phenylene diamine or those substitution products of phenylene diamine which still carry at least one primary amino group, are highly suitable for anti-halation purposes on account of their light absorption in the wavelength range from 650 to 800 m$\mu$. These triphenyl methane dyestuffs correspond most probably to the following general formula:

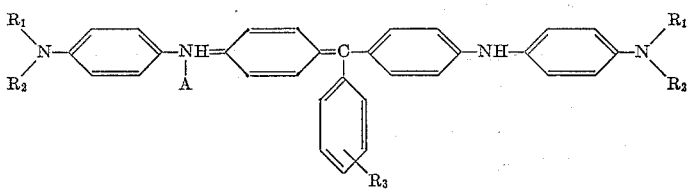

wherein $R_1$ and $R_2$ stand for a substituent selected from the group consisting of hydrogen, lower alkyl groups, such as methyl, ethyl, propyl, butyl, substituted alkyl groups such as alkyl groups which are substituted by a hydroxy or carboxylic acid group (—$CH_2.COOH$, —$CH_2.CH_2.OH$); aryl groups such as phenyl or substituted phenyl groups, possible substituents being alkyl, aryl, aralkyl, halogen, alkoxyalkyl, amino, substituted amino, carboxylic acid, carboxylic acid ester, carboxy alkyl groups; and aralkyl groups, such as benzyl. $R_3$ stands for hydrogen, halogen (chlorine, bromine, iodine, fluorine), or an alkyl group (methyl, ethyl, propyl, butyl). A is an anion of an inorganic or organic acid such as hydrochloric, sulfuric, acetic, propionic, benzoic acid, succinic acid, adipic acid, phthalic acid or an internal salt like linkage where at least one of the substituents $R_1$ and $R_2$ contains an acid group.

Suitable carbinols for producing the above dyestuffs correspond to the general formula:

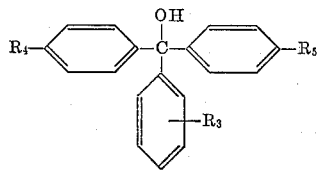

wherein $R_4$, $R_5$ stand for halogen (chlorine, bromine, iodine) alkoxy (methoxy, ethoxy, isopropoxy) $R_4$ and $R_5$ being the same or different and $R_3$ has the same meaning as above.

The phenylendiamines which are reacted with the above carbinols correspond to the general formula:

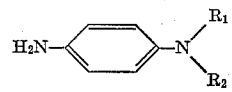

wherein $R_1$ and $R_2$ have the same meaning as above.

For producing the dyestuffs about one mole of one of the above carbinols is reacted with about 2 moles of one of the above phenylendiamines at 100–200° C. in the presence of an acid the dissociation constant of which does not surpass that of acetic acid, such as acetic acid, propionic acid, adipic acid, succinic acid, benzoic acid, phthalic acid. The reaction may be carried through in the presence or in the absence of a solvent such as dioxane, dimethylformamide, dimethylsulfoxide (($CH_3$)$_2$S=O) ethyleneglycol, glycerol, or trimethylolpropene.

The acids are preferably applied in molar or higher quantities based on the quantity of carbinol. For working up, the reaction product after cooling to room temperature is washed with water containing sodium carbonate, sodiumhydroxide or similar alkaline agents until the surplus of acid is removed. The dyestuffs may then be treated with a molar surplus of an alkaline agent such as an aqueous solution of sodium hydroxide to convert the dyestuff into the corresponding carbinol. After washing with water until neutral the carbinol is treated with an acid the dissociation constant of which is at least as high as that of benzoic acid and not higher than that of 10% aqueous hydrochloric acid (sulfuric acid, hydrochloric acid, phosphoric acid, acetic acid, propionic acid, adipic acid, succinic acid, benzoic acid, phthalic acid are suitable examples) to convert the carbinol into the corresponding salt. In case that an inner salt of the dyestuff is produced, the surplus of acid is washed out by means of an aqueous alkaline solution.

In order to produce an effective anti-halation protection, the dyestuffs can be used for dyeing the film support or for the production of a separate anti-halation layer. In the first-mentioned case, the dyestuffs are added to the film casting solution prior to casting (about 50 to 100 g. per 100 kg. of film forming agent) or the finally cast film is dyed on the surface by means of a dyestuff solution by the dipping or coating process.

In order to produce a separate anti-halation layer, alkali-soluble natural or synthetic resins or gelatine may be used as binding agent for the dyestuffs. Particularly suitable for this purpose are: polymers or copolymers containing acid groups, such as polyacrylic acids, copolymers of styrene and acrylic acid, copolymers of vinyl acetate and maleic anhydride, copolymers of vinyl chloride and acrylic acid, copolymers of maleic anhydride and vinyl alkyl esters, polycarbonates containing acid groups as disclosed in Belgian Patent 559,529 and natural resins which contain acid groups and are soluble in the treatment baths.

Triphenyl methane dyestuffs have the property of changing to red in alkaline media. Such a change in color also occurs with the aforementioned triphenyl methane dyestuffs when they are applied together with an alkali-soluble binder as an anti-halation layer to the back of a film and are processed in alkaline developers. However, if these triphenyl methane dyestuffs are incorporated into the film casting solution, the color of the film support is not modified in alkaline baths, because the hydrophobic nature of the film support prevents access of aqueous alkali to the dyestuff.

The film base into which the present dyestuffs are incorporated or to which the antihalation is applied is the usual photographic film base as for instance of cellulose esters (celluloseacetate, celluloseacetobutyrate) polyesters (polyethyleneterephthalate) polyamides, polyvinylchloride, polycarbonates. On this film base is coated a silver halide emulsion layer either on the same side as the antihalation layer or on the opposite side.

In the accompanying drawing the FIGURE illustrates a film base having a silver halide emulsion layer on one side and the anti-halation layer on the other side thereof.

*Example 1*

A mixture of
495 kg. of methylene chloride and
55 kg. of isopropanol has dissolved therein
10 kg. of triphenyl phosphate
5 kg. of tricresyl phosphate
95 g. of a triphenyl methane dyestuff obtained from p,p'-dimethoxy-o''-chlorotriphenyl carbinol and p-amidodiphenylamine of the following probable constitution

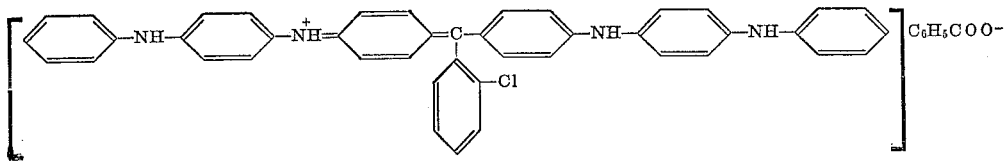

18 g. of Ceresschwarz BN (corresponds to CI solvent black, No. 26,150 in Colour Index, 2nd edition, 1956)
10 g. of Ceresrot G (corresponds to Sudanrot G, No. 12,150, Colour Index, 2nd edition, 1956) and
10 g. of Celitonechtgelb G (No. 11,855, Colour Index, 2nd edition, 1956)

100 kg. of cellulose triacetate with a content of 60.5 to 61.2% of acetic acid are added to the blue solution obtained in this manner and stirred until the cellulose triacetate has completely dissolved. A viscous film casting solution is obtained which is blue in color and which can be cast in the usual manner on a drum or web casting machine. A film produced therefrom with a thickness of 125μ shows a uniform absorption in the entire visible range of light, including the infra-red range, from 400–800μ with a constant optical density of 0.22 to 0.25. The above triphenyl methane dyestuff is produced as follows:

A mixture of 70 parts by weight of p,p'-dimethoxy-o''-chlorophenylcarbinol and 100 parts by weight of benzoic acid are heated while stirring at 160–165° C. until a clear melt is obtained. To this melt there are slowly added at the same temperature while stirring 80 parts by weight of p-amino-diphenyl-amine. The melt is kept at the aforementioned temperature for one hour. After cooling to room temperature the melt is powdered, the surplus of benzoic acid is washed out by means of 5% aqueous solution of sodium hydroxide, whereafter the dyestuff is washed with water until neutral and dried in vacuum. Yield 130–140 parts by weight. The dyestuff obtained is soluble in lower alcohols such as methanol, ethanol. The absorption maximum of the dyestuff lies at 710 mμ and has an extinction of log. $\epsilon = 4.5$ (ethylalcohol solution containing 60 mg./l., layer thickness 1 cm.).

The absorption of the dyestuff at an extinction of log. $\epsilon = 4.5$ covers the wave lengths between about 640 mμ and 800 mμ.

*Example 2*

A mixture of
510 kg. of methylene chloride and
40 kg. of methanol has dissolved therein
15 kg. of triphenyl phosphate
80 g. of a triphenyl methane dyestuff obtained from p,p'-dimethoxy diphenyl carbinol and p-phenylene diamine of the following probable constitution

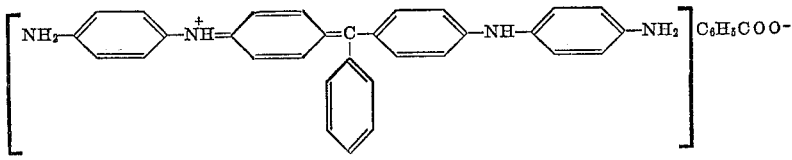

20 g. of Ceresschwarz BN
8 g. of Ceresrot G and
10 g. of Cellitonechtgelb G 100 kg. of cellulose triacetate are incorporated by stirring into the blue solution thus obtained, until the said triacetate has completely dissolved. The viscous film casting solution has a cyan color and is cast in the usual manner to provide films.

A film produced in this way with a thickness of 125μ shows a substantially uniform absorption from 400 to 700 mμ with an optical density of 0.20 to 0.22. The absorption decreases gradually in the range from 700 to 800 mμ.

The triphenyl methane dyestuff of this example is produced as follows:

A mixture of 33.7 parts by weight of p-p'-dimethoxy-diphenylcarbinol and 90 parts by weight of benzoic acid is heated while stirring at 130° C. until a clear melt is obtained.

To the melt there are added 23.7 parts by weight of p-phenylenediamine in small portions. Thereafter the temperature of the reaction mixture is raised to 150° C., the mixture being kept at this temperature for one hour. The melt is cooled down to 80° C. and added to 4000 parts by weight of distilled water. The water is thereafter decanted and the reaction product is treated once

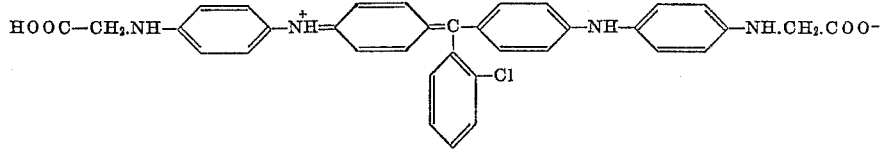

more in the same manner with 4000 parts by weight of distilled water at 60° C. After repeating this procedure twice the reaction product is washed twice with 600 parts by weight of benzene. The dyestuff obtained is dissolved in 1 l. of methanol and filtered. After evaporating the methanol, there are obtained 42 g. of the dyestuff having an absorption maximum at 660–680 m$\mu$ and an extinction at log. $\epsilon$=4.25.

*Example 3*

A mixture of 500 kg. of methylene chloride
45 kg. of methanol and
5 kg. of ethylene chloride has dissolved therein
15 kg. of triphenyl phosphate

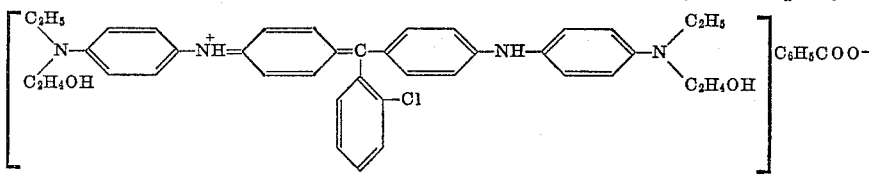

90 g. of a triphenyl methane dyestuff obtained from p,p'-dimethoxy-o''-chlorotriphenyl carbinol and p-amino-N-hydroxyethyl-N-ethyl aniline of the following probable constitution
18 g. of Ceresschwarz BN
9 g. of Ceresrot G and
10 g. of Cellitonechtgelb 100 kg. of cellulose triacetate are incorporated by stirring into this solution until completely dissolved.

The blue-colored film-casting solution is cast in the usual manner to provide films. A film with a thickness of 125$\mu$ shows a uniform absorption from 400 to 800 m$\mu$ with an optical density of 0.23 to 0.25.

The triphenyl methane dyestuff of this example is prepared as follows:

A mixture of 90 parts by weight of benzoic acid and 36 parts by weight of p,p'-dimethoxy-o''-chlortriphenyl-carbinol is heated to 130° C. To this mixture there are added 43 parts by weight of p-amino-N-oxyethyl-N-ethyl-aniline. The melt is heated for half an hour at 150° C. Thereafter it is cooled to room temperature, powdered and boiled three times with 1500 parts by weight of distilled water. The residue is washed 3 times with 500 parts by weight of hot benzene. Yield 32 parts by weight. Absorption maximum 720 m$\mu$, extinction log. $\epsilon$=4.2.

*Example 4*

A mixture of 530 kg. of methylene chloride and
25 kg. of ethanol has dissolved therein
15 kg. of triphenyl phosphate
95 g. of a triphenyl methane dyestuff obtained from p,p'-dimethoxy-o''-chlorotriphenyl carbinol and p-aminophenyl glycine of the following probable constitution

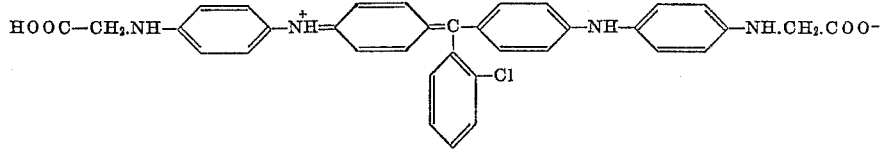

20 g. of Ceresschwarz BN
10 g. of Ceresrot G and
10 g. of Cellitonechtgelb G 100 kg. of cellulose triacetate are incorporated by stirring into this solution until completely dissolved. The blue film casting solution is cast in the usual manner to provide films. A film with a thickness of 125$\mu$ shows a uniform absorption from 400 to 730 m$\mu$ with an optical density of 0.22 to 0.24. The absorption decreases gradually in the range from 730 to 800 m$\mu$.

The triphenyl methane dyestuff of this example is prepared according to the procedure given in Example 3, replacing the p-amino-N-oxyethyl-N-ethyl aniline of Example 3 by 20 parts by weight of p-aminophenylglycine.

*Example 5*

73 g. of a triphenyl methane dyestuff as described in Example 1 and 6 g. of a dyestuff having the following probable constitution

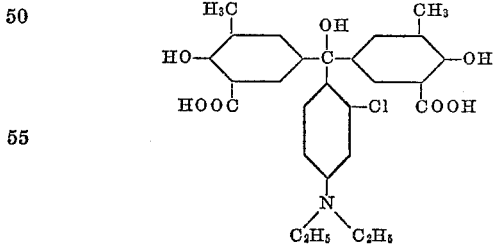

are dissolved in 700 cc. of ethanol
150 cc. of acetic ester and
100 cc. of butanol
70 g. of an alkali soluble copolymer of vinylbutylether and maleic acid monomethylester
2 g. of methylene disalicylic acid are added to the solution A deep blue solution is obtained which, after being applied to the back of a film support and dried, produces a deep blue layer with a uniform absorption over the entire spectrum from 400 to 800 m$\mu$. The colored layer is bleached in alkaline developers as they ordinarily used for the development of exposed silver halide emulsion layers.

We claim:
1. A photographic element comprising in combination a film base, a silver halide emulsion layer on said base, and an antihalation dye carried by said base and having the general formula:

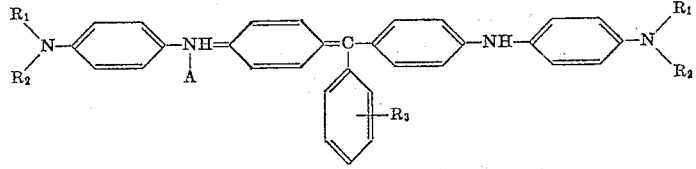

wherein $R_1$ and $R_2$ stand for a substituent selected from the group consisting of hydrogen, lower alkyl, hydroxyalkyl, carboxyalkyl, and phenyl; $R_3$ stands for a member selected from the group consisting of hydrogen, halogen, and lower alkyl; and A stands for a member of the group consisting of the anion of an acid when the compound is otherwise free of carboxyalkyl groups, and an internal linkage to such carboxyalkyl groups when at least one of the substituents $R_1$ and $R_2$ contains such group.

2. A photographic element according to claim 1 wherein said triphenyl methane dyestuff is incorporated in said film base.

References Cited in the file of this patent
UNITED STATES PATENTS
2,606,833     Glickman              Aug. 12, 1952